United States Patent [19]

Duprez et al.

[11] Patent Number: 4,562,953
[45] Date of Patent: Jan. 7, 1986

[54] VALVE SEAT STRUCTURE FOR AUTOMOTIVE THERMOSTATIC FLUID CONTROL VALVE DEVICE

[75] Inventors: Wayne R. Duprez, Waltham, Mass.; Bradley J. McKenzie, Kingston, N.H.

[73] Assignee: Standard-Thomson Corporation, Waltham, Mass.

[21] Appl. No.: 656,685

[22] Filed: Oct. 1, 1984

[51] Int. Cl.[4] .............................................. F01P 7/02
[52] U.S. Cl. .................................. 236/34.5; 251/333; 251/363
[58] Field of Search ................. 236/34, 34.5; 251/363, 251/364, 333

[56] References Cited

U.S. PATENT DOCUMENTS

| 271,073 | 1/1883 | Jenkins | 251/364 X |
| 802,490 | 10/1905 | Bashlin | 251/364 X |
| 1,216,528 | 2/1917 | Wickert, Jr. | 251/364 |
| 1,954,044 | 4/1934 | Guildford | 251/333 X |
| 2,616,653 | 11/1952 | Tarr | 251/333 |
| 3,168,282 | 2/1965 | Catshaw, Jr. et al. | 251/333 |
| 3,893,618 | 7/1975 | Wong et al. | 236/34.5 X |
| 4,280,655 | 7/1981 | Duprez et al. | 236/34.5 |
| 4,426,036 | 1/1984 | Sliger | 236/34.5 |

*Primary Examiner*—William E. Tapolcai
*Attorney, Agent, or Firm*—Jacox & Meckstroth

[57] ABSTRACT

Valve seat structure for an automotive thermostatic fluid control valve device. The valve seat structure comprises a rigid fluid flow control member which includes a cylindrical wall which forms a fluid flow passage and an annular base which encompasses the cylindrical wall. An elastomeric sealing member or engagement member resiliently encompasses the cylindrical wall and is clamped between two portions of a fluid conduit to position the valve seat structure within the fluid conduit. The elastomeric sealing member is also engageable by a movable valve member to control fluid flow through the fluid flow passage. The cylindrical wall extends beyond the elastomeric sealing member and protects the elastomeric sealing member against the forces of fluid flow.

6 Claims, 6 Drawing Figures

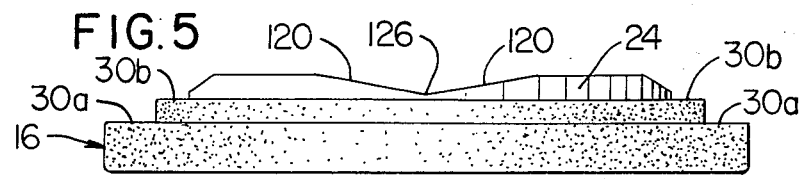
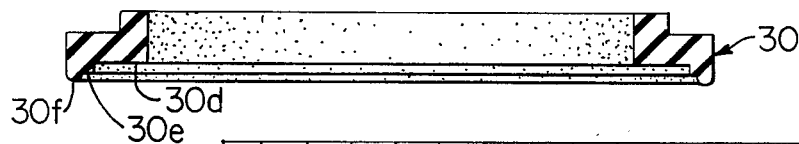
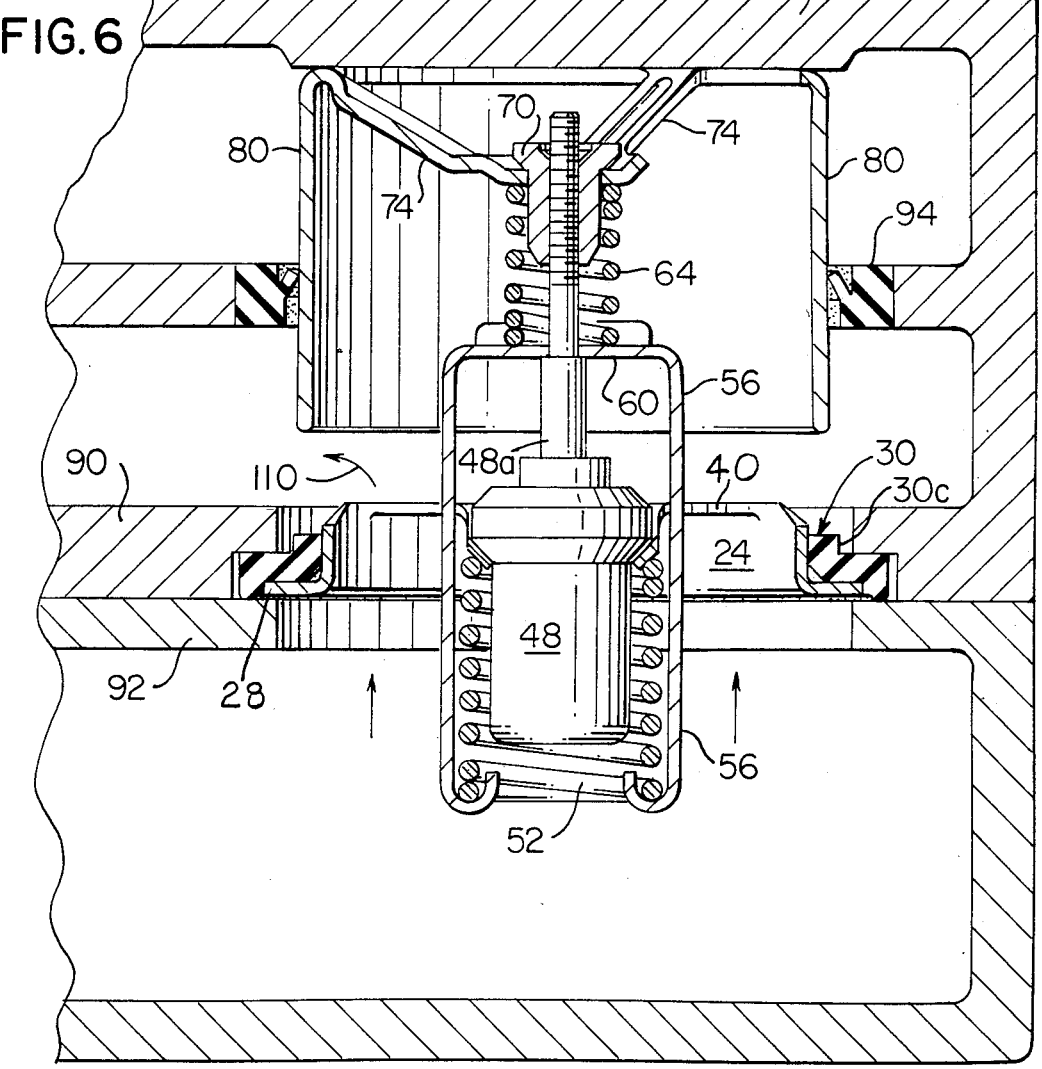

VALVE SEAT STRUCTURE FOR AUTOMOTIVE THERMOSTATIC FLUID CONTROL VALVE DEVICE

BACKGROUND OF THE INVENTION

This invention relates, at least generally, inter alia, to the subject matter of U.S. Pat. Nos. 3,893,618, 4,053,105, 4,164,322, 4,280,655, and 4,286,750. The thermally responsive fluid control valves disclosed in these patents control fluid flow in a fluid conduit in accordance with the temperature of the fluid flowing in the fluid conduit. The thermally responsive fluid control devices are particularly adapted to be positioned within the cooling system of an automotive engine to control flow of fluid within the cooling system.

An object of this invention is to provide such valve seat structure in which an elastomeric seal member is positioned to provide good sealing but which is not subject to the forces of flowing fluid.

Another object of this invention is to provide such valve seat structure for a thermostatic fluid control valve device which includes a sealing member and which eliminates the need for a separate sealing gasket.

Another object of this invention is to provide such valve seat structure which seals against fluid flow between the valve seat structure and the fluid conduit within which the valve seat structure is mounted and which also seals against fluid flow between the valve seat structure and a movable valve member which engages the valve seat structure.

Another object of this invention is to provide such valve seat structure which includes an elastomeric seal member which is supported by a rigid support element, but which does not have to be molded to the rigid support element or attached to the rigid support element.

Another object of this invention is to provide fluid control valve seat structure which reduces costs of production and which simplifies assembly.

Another object of this invention is to provide such fluid control valve seat structure which has long life and which is capable of operation through a multiplicity of valving cycles without failure of parts of the valve seat structure.

Other objects and advantages of this invention reside in the construction of parts, the combination thereof, the method of production and the mode of operation, as will become more apparent from the following description.

SUMMARY OF THE INVENTION

Valve seat structure of this invention includes a rigid cylindrical wall which forms a fluid passage therethrough and is adapted to be secured within a fluid conduit of the cooling system of an internal combustion engine or the like. The valve seat structure also includes an annular base which encompasses the cylindrical wall and is attached thereto. The valve seat structure is adapted to be a part of any one of several types of fluid control valve devices. Closely encompassing the cylindrical wall is an annular elastomeric engagement member. The elastomeric engagement member has two engagement portions. One engagement portion is adapted to be clamped within a fluid conduit of an automotive engine cooling system to maintain the position of the valve seat structure within the fluid conduit and to seal against fluid flow between the valve seat structure and the fluid conduit. The elastomeric engagement member of the valve seat structure also has an engagement portion which is engageable by a movable valve member to control or prevent flow of fluid through the stationary valve seat structure. A thermally responsive actuator member is positioned to be responsive to the temperature conditions of fluid within the fluid conduit and is operably joined to the movable valve member for movement thereof in accordance with the temperature of the fluid in the cooling system.

BRIEF DESCRIPTION OF THE VIEWS OF THE DRAWINGS

FIG. 3 is a side elevational view of a flow director member of the valve seat structure of this invention.

FIG. 4 is a sectional view of an engagement member of the valve seat structure of this invention.

FIG. 5 is a side elevational view of the valve seat structure of this invention.

FIG. 6 is a sectional view similar to FIG. 1 showing the movable valve member of the fluid control device in another position of operation and showing a portion of the fluid conduit system within which the fluid control device is mounted.

DETAILED DESCRIPTION OF THE INVENTION

Figure 1:
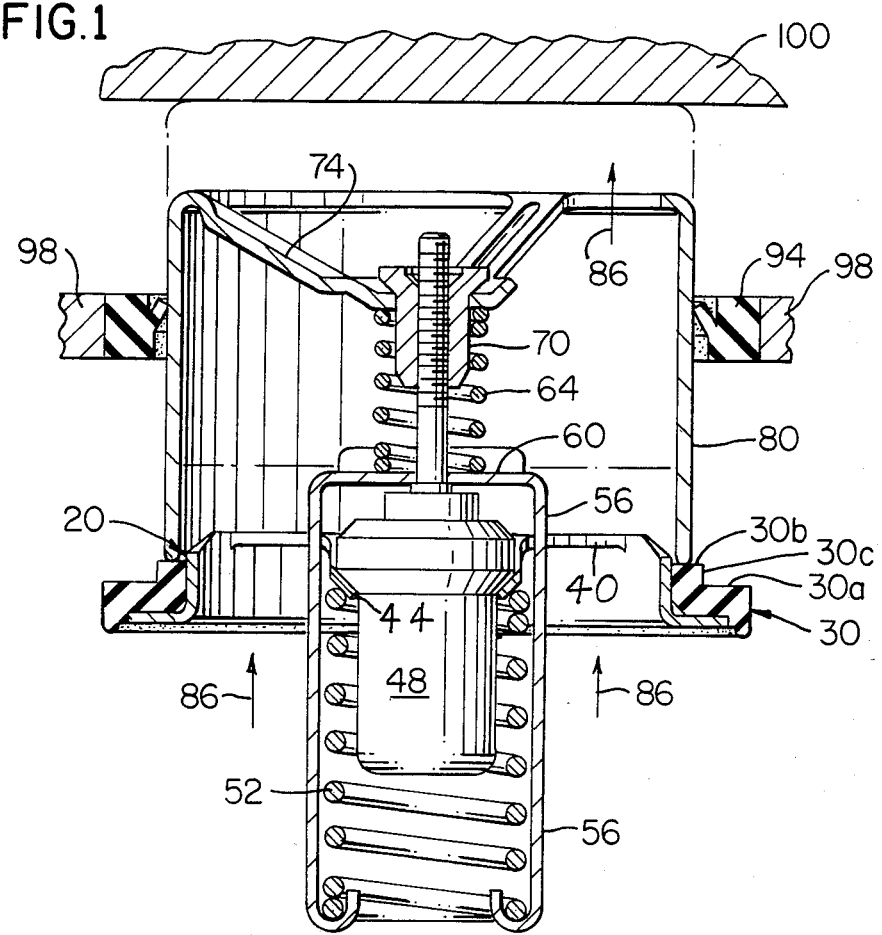
FIG. 1 is a sectional view illustrating a thermostatic fluid control valve device which includes stationary valve seat structure of this invention, showing a movable valve member of the fluid control valve device in engagement with the stationary valve seat structure and showing a portion of a fluid conduit system.

Stationary valve structure 16 of this invention includes a flow director member 20 which is of rigid material. The flow director member 20 has a generally cylindrical wall 24 which forms a flow passage. The flow director member 20 also includes an annular base 28, which encompasses the cylindrical wall 24 and is attached thereto. Encompassing the cylindrical wall 24, and resting upon the annular base 28, is an annular engagement member or sealing member 30 which is of elastomeric material and which is provided with a surface 30a and a surface 30b. The surfaces 30a and 30b are joined by a shoulder 30c. Opposite the surfaces 30a and 30b, the engagement member 30 has a surface 30d, which is in engagement with the base 28 of the flow director member 20, and a surface 30e, which is encompassed by a flange 30f, as shown in FIG. 4. The surface 30e and the flange 30f encompass the base 28 of the flow director member 20, as shown in FIG. 1. The engagement member 30 snugly resiliently encompasses the cylindrical wall 24, without the need for bonding or other means of attachment of the engagement member 30 to the flow director member 20. The cylindrical wall 24 extends beyond the engagement member 30, as shown in FIGS. 1, 5, and 6.

Figure 2:
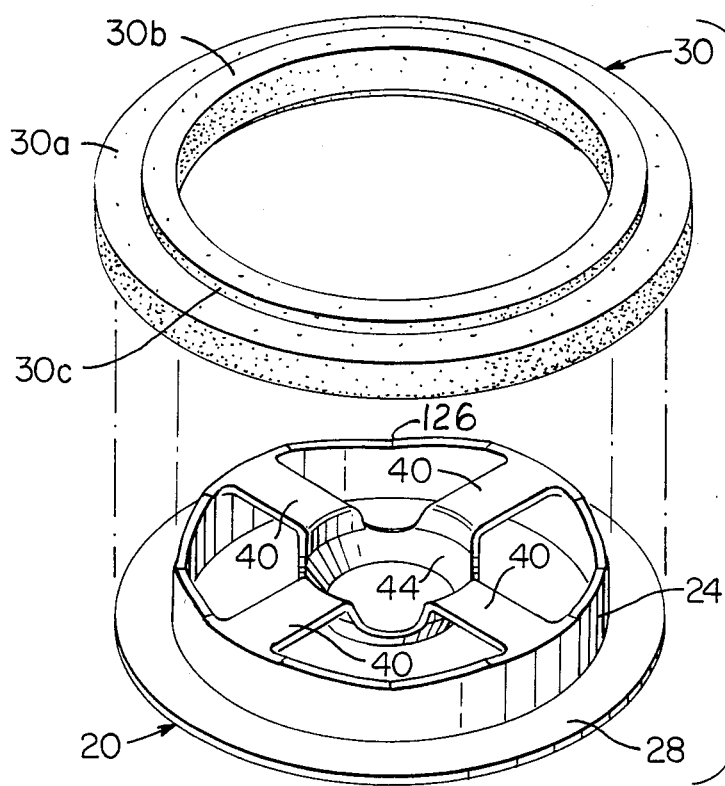
FIG. 2 is an exploded perspective view of the stationary valve seat structure of this invention.

The flow director member 20 includes connector members 40 joined to the cylindrical wall 24. The connector members 40 extend radially between the cylindrical wall 24 and an annular centrally located support portion 44, as shown in FIG. 2.

The support portion 44 supports a thermally responsive actuator member 48, which may be of any suitable type, such as, for example, the type shown in U.S. Pat. Nos. 2,806,375 and 2,806,376.

The stationary valve seat structure 16 of this invention is adapted to be a part of any one of various types of fluid control devices. Herein the stationary valve seat structure of this invention is shown as being in combination with a helical spring 52 which encompasses the actuator member 48 and engages the support portion 44 of the flow director member 20. The helical spring 52 also engages end portions of connector legs 56. The opposite ends of the connector legs 56 are joined to a cross member 60.

In engagement with the cross member 60 is an auxiliary helical spring 64. The actuator member 48 has an actuator stem 48a which also engages the cross member 60. The actuator stem 48a extends through the cross member 60 and also extends through the auxiliary helical spring 64. The actuator stem 48a is attached to a nut 70 which is attached to a plurality of spaced-apart arms 74. The arms 74 are attached to a movable valve member 80, herein shown as being a cylindrical member. The cylindrical movable valve member 80 is completely open at one end thereof The spaced-apart arms 74 at the other end of the movable valve member 80 form a plurality of openings therebetween, as shown in FIG. 1.

As illustrated in FIG. 6, a thermostatic fluid control device which includes stationary valve structure of this invention is adapted to be positioned within a fluid flow system. The elastomeric engagement member or sealing member 30 is clamped between a conduit member 90 and a conduit member 92, as the surface 30b is engaged by the conduit member 90 and the flange 30f is in engagement with the conduit 92. Due to the fact that the engagement member 30 is of elastomeric material the engagement member 30, which is clamped between the conduit members 90 and 92, seals against flow of fluid between the engagement member 30 and the conduit members 90 and 92. A separate sealing gasket is not necessary.

The movable valve member 80 is slidably movable with respect to a seal ring 94 and is encompassed thereby. The seal ring 94 is attached to a partition 98 which is a part of the fluid conduit system. The movable valve member 80 is movable toward and away from an enclosure wall 100.

Normally the movable valve member 80 is in engagement with the surface 30b of the engagement member 30, as shown in FIG. 1. Due to the fact that the engagement member 30 is of elastomeric material, there is good sealing between the movable valve member 80 and the engagement member 30, and there is no fluid flow therebetween.

The thermostatic fluid control valve device shown herein is of the type referred to as a by-pass valve device. The thermostatic fluid control valve device is shown in the figures of the drawings as being vertically oriented. However, of course, the orientation of the device may be in any other desired manner. Normally, fluid flow through the fluid control valve device is upwardly, through the valve seat structure 16 and through the movable valve member 80, as illustrated by arrows 86 in FIG. 1. Fluid flowing through the valve seat structure 16 flows past the thermally responsive actuator member 48. Thus, the thermally responsive actuator member 48 senses the temperature of the fluid flow. When the temperature of the fluid exceeds a predetermined value, the thermally responsive actuator member 48 responds, and the actuator stem 48a is moved upwardly. Thus, the movable valve member 80 is moved upwardly, as illustrated in FIG. 6. As the movable valve member 80 moves upwardly, some of the fluid flowing in the coolant system flows between the movable valve member 80 and the cylindrical wall 24.

Due to the fact that the cylindrical wall 24 of the stationary valve seat structure 16 of this invention is of rigid material, there is negligible wear upon the cylindrical wall 24 as a result of the forces of fluid flow upon or against the cylindrical wall 24. Due to the fact that the cylindrical wall 24 extends above the elastomeric engagement member 30, the cylindrical wall 24 protects the elastomeric engagement member 30, and the elastomeric engagement member 30 is not subjected to the direct forces of fluid flow. Therefore, the elastomeric engagement member 30 is not subject to damage by the forces of fluid which flows through the flow director member 20.

When the thermally responsive actuator member 48 is subjected to higher temperatures, the actuator stem 48a moves upwardly and moves the movable valve member 80 upwardly, into engagement with the enclosure wall 100, as shown in FIG. 6. As the movable valve member 80 is in engagement with the enclosure wall 100, the upper end of the movable valve member 80 is closed, and all the fluid flow is between the movable valve member 80 and the cylindrical wall 24 of the stationary valve seat structure 16, as illustrated by an arrow 110 in FIG. 6.

The upper edge of the cylindrical wall 24 of the flow director member 20 may be planar or any other desired shape or configuration. Herein, the upper edge of the cylindrical wall 24 is shown in FIGS. 2, 3, and 5 as having pairs of inclined surfaces 120, which form notches 126 in the upper edge of the cylindrical wall 24. Therefore, as the movable valve member 80 initially moves upwardly from the engagement member 30, fluid flow occurs only through the notches 126 of the cylindrical wall 24. Thus, initial fluid flow is limited, and the thermally responsive actuator 48 is not subjected to sudden changes in temperature of the flowing fluid. Thus, there is smooth direct travel of the movable valve member 80, and there is no fluctuation in the initial movement thereof. As stated above, due to the fact that the cylindrical wall 24 of the stationary valve seat structure 16 is of rigid material, fluid flow past the upper edge of the wall 24 and/or through the notches 126 does not cause significant wear upon the cylindrical wall 24. Therefore, the cylindrical wall 24 has long life, while protecting the engagement member 30 from direct forces of fluid flow.

Due to the fact that the engagement member 16 does not need to be attached to the flow director member 20, as stated above, bonding of the engagement member 16 to the flow director member 20 or any other means of attachment of the engagement member 16 to the flow director member 20 is not necessary. Therefore, costs of assembly and production are minimum. Furthermore, the elastomeric material of the engagement member 16 is of a quality which is readily adapted for sealing, and does not need to be of the type which is bondable or attachable to another element.

Although the preferred embodiment of the valve seat structure of this invention has been described, it will be understood that within the purview of this invention various changes may be made in the form, details, proportion and arrangement of parts, the combination thereof, and the mode of operation, which generally stated consist in valve seat structure within the scope of the appended claims.

The invention having thus been described, the following is claimed:

1. A thermostatic fluid control valve device adapted to be positioned within a coolant fluid conduit system of an internal combustion engine in which the valve device has stationary valve structure which is retained between two parts of the coolant fluid conduit system, the stationary valve structure forming a fluid port, and in which the valve device is provided with movable valve structure, the movable valve structure being movable toward and away from the stationary valve structure and being movable into engagement with the stationary valve structure to control flow of fluid through the fluid port, the valve device also being provided with a thermally responsive actuator operably joined to the movable valve structure for movement thereof, the improvement wherein the stationary valve structure comprises a rigid cylindrical wall forming a flow passage and provided with a given minimum axial dimension, an annular elastomeric sealing member resiliently encompassing the rigid cylindrical wall, the annular elastomeric sealing member having an axial dimension less than the minimum axial dimension of the rigid cylindrical wall so that the rigid cylindrical wall has an extending engagement portion which extends beyond the elastomeric sealing member and which is engageable by fluid flow and which protects the annular elastomeric sealing member against fluid flow, the annular elastomeric sealing member including an annular clamping portion spaced from the rigid cylindrical wall and being adapted to be clamped between two parts of a fluid conduit system, the elastomeric sealing member also including an annular abutment portion which is positioned between the annular clamping portion and the rigid cylindrical wall and which is engageable by the movable valve structure to prevent flow of fluid between the rigid cylindrical wall and the movable valve structure, the annular clamping portion of the annular elastomeric sealing member having a diameter greater than the diameter of the annular abutment portion, the movable valve structure being movable by the thermally responsive actuator to a position spaced from the elastomeric sealing member to permit flow of fluid between the rigid cylindrical wall and the movable valve structure.

2. The thermostatic fluid control valve device of claim 1 which includes an annular rigid flange joined to the rigid cylindrical wall and encompassing the rigid cylindrical wall, the annular rigid flange and the annular elastomeric sealing member having substantially the same diameter dimensions and being in mutual engagement, the annular rigid flange being in supporting relationship to the annular elastomeric sealing member.

3. The thermostatic fluid control valve device of claim 1 in which the annular elastomeric sealing member is free from rigid structural support therewithin.

4. The thermostatic fluid control valve device of claim 1 in which the annular elastomeric sealing member is free from attachment to the rigid cylindrical wall.

5. A thermostatic fluid control valve device adapted to be positioned within a coolant fluid conduit system of an internal combustion engine in which the valve device has stationary valve structure which is retained between two parts of the coolant fluid conduit system, the stationary valve structure forming a fluid port, and in which the valve device is provided with movable valve structure, the movable valve structure being movable toward and away from the stationary valve structure and being movable into engagement with the stationary valve structure to control flow of fluid through the fluid port, the valve device also being provided with a thermally responsive actuator operably joined to the movable valve structure for movement thereof, the improvement wherein the stationary valve structure comprises a rigid cylindrical wall forming an axially extending flow passage, the rigid cylindrical wall having a lower portion and an upper portion, the rigid cylindrical wall having given minimum axial dimension extending between the lower portion thereof and the upper portion thereof, a rigid annular flange attached to the rigid cylindrical wall at the lower portion thereof and extending at a right angle therefrom, an annular elastomeric sealing member resiliently encompassing the rigid cylindrical wall and resting upon the annular flange, the annular elastomeric sealing member having an axial dimension less than the minimum axial dimension of the rigid cylindrical wall so that the upper portion of the rigid cylindrical wall extends beyond the elastomeric sealing member and protects the annular elastomeric sealing member against fluid flow, the annular elastomeric sealing member including an annular clamping portion, the annular clamping portion of the elastomeric sealing member being adapted to be clamped between two parts of a fluid conduit system to prevent flow of fluid therebetween and to retain the position of the valve device with respect to the fluid conduit system, the elastomeric sealing member also including an annular abutment portion which is engageable by the movable valve structure to prevent flow of fluid between the rigid cylindrical wall and the movable valve structure, the diameter of the annular clamping portion of the elastomeric sealing member being greater than the diameter of the annular engagement portion, the movable valve structure being movable by the thermally responsive actuator to a position spaced from the elastomeric sealing member to permit flow of fluid between the rigid cylindrical wall and the movable valve structure.

6. The thermostatic fluid control device of claim 5 in which the rigid cylindrical wall and the annular flange are an integral rigid member and in which the annular elastomeric sealing member is a separate member which is not attached to the integral rigid member.

* * * * *